US009940566B2

(12) United States Patent
Arias Navarro et al.

(10) Patent No.: US 9,940,566 B2
(45) Date of Patent: *Apr. 10, 2018

(54) EXTRACTING INFORMATION FROM SURFACE COATINGS

(71) Applicant: International Business Machines Corporation, Armonk, NY (US)

(72) Inventors: Esteban Arias Navarro, Heredia (CR); Franz Friedrich Liebinger Portela, Heredia (CR); Edgar Adolfo Zamora Duran, Heredia (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,360

(22) Filed: Aug. 26, 2016

(65) Prior Publication Data

US 2017/0206443 A1   Jul. 20, 2017

Related U.S. Application Data

(63) Continuation of application No. 14/996,955, filed on Jan. 15, 2016.

(51) Int. Cl.
*G06K 7/08* (2006.01)
*G06K 19/06* (2006.01)
(Continued)

(52) U.S. Cl.
CPC ..... *G06K 19/0614* (2013.01); *G06K 7/10732* (2013.01); *G06K 7/10881* (2013.01);
(Continued)

(58) Field of Classification Search
CPC .. G06K 7/0008; G06K 7/14; G06K 19/06037; G06K 7/1443; G06F 3/1454
(Continued)

(56) References Cited

U.S. PATENT DOCUMENTS 4,488,679 A   12/1984   Bockholt et al.
4,843,599 A    6/1989   Bucker
(Continued)

FOREIGN PATENT DOCUMENTS

CA   2 342 466 A1    9/2001
CA    2777138 A1   11/2012
(Continued)

OTHER PUBLICATIONS

Don Michael Acelar De Leon, "Handheld Scanner Easily Identifies Colors", http://www.psfk.com/2010/10/handheld-scanner-easily-identifies-colors.html, Oct. 26, 2010.
(Continued)

*Primary Examiner* — Karl D Frech
(74) *Attorney, Agent, or Firm* — Scully, Scott, Murphy & Presser, P.C.; Scott Dobson, Esq.

(57) ABSTRACT

A method and system for extracting information from a surface coated with a coating containing quantum dots are disclosed. In embodiments, the method comprises charging the quantum dots in the surface coating, scanning the surface to retrieve information from the quantum dots, and processing the retrieved information to identify data encoded in the quantum dots. In embodiments of the invention, the processing includes filtering the retrieved information to adjust the received information based on defined effects of the coating. In embodiments of the invention, the filtering includes filtering the retrieved information to account for chromatic deviation due to the color of the coated surface. In embodiments of the invention, the quantum dots include a plurality of different types of quantum dots, and the processing the retrieved information includes processing the retrieved information to distinguish between the information retrieved from the different types of quantum dots.

20 Claims, 10 Drawing Sheets

QUANTUM DOTS ARE EXPOSED OVER ALL THE SURFACE OF THE PAINT (51) Int. Cl.
*G06K 7/10* (2006.01)
*G06K 7/14* (2006.01)
*G06K 7/12* (2006.01)

(52) U.S. Cl.
CPC ............. *G06K 7/12* (2013.01); *G06K 7/1413* (2013.01); *G06K 7/1417* (2013.01); *G06K 19/06028* (2013.01); *G06K 19/06037* (2013.01)

(58) Field of Classification Search
USPC .................................. 235/451, 494, 462.09
See application file for complete search history.

(56) References Cited

U.S. PATENT DOCUMENTS

| | | | |
|---|---|---|---|
| 5,369,261 | A | 11/1994 | Shamir |
| 5,576,528 | A | 11/1996 | Chew et al. |
| 6,692,031 | B2 | 2/2004 | McGrew |
| 7,027,068 | B2 | 4/2006 | Thompson |
| 7,860,856 | B2 | 12/2010 | Lewis |
| 8,229,210 | B2 | 7/2012 | Rao |
| 8,588,262 | B1 | 11/2013 | Safai |
| 2006/0055945 | A1 | 3/2006 | Fazakerly |
| 2007/0220604 | A1 | 9/2007 | Long |
| 2009/0045360 | A1 | 2/2009 | Wosnick et al. |
| 2009/0297448 | A1* | 12/2009 | Yan ........................ B82Y 10/00 424/9.1 |
| 2009/0325631 | A1 | 12/2009 | Linjama et al. |
| 2011/0078794 | A1 | 3/2011 | Manni et al. |
| 2012/0237740 | A1 | 9/2012 | Hefty et al. |
| 2014/0068763 | A1 | 3/2014 | Ward et al. |
| 2014/0158954 | A1 | 6/2014 | Lun et al. |
| 2014/0264196 | A1 | 9/2014 | Werner et al. |

FOREIGN PATENT DOCUMENTS

| | | |
|---|---|---|
| CN | 102673203 A | 9/2012 |
| WO | WO 2005/086076 A1 | 9/2005 |
| WO | WO 2009/035571 A2 | 3/2009 |
| WO | 2010071137 A1 | 6/2010 |

OTHER PUBLICATIONS

Lomas, "Nix is a Smartphone Colour Sensor & App That Lets You Scan & Save Favourite Shades", techcrunch.com, posted Sep. 17, 2013, pp. 1-7.

Zyga, "Researchers prepare cheap quantum dot solar paint", http://phys.or/news/2011-12-cheap-quantum-dot-solar.html, Dec. 16, 2011, pp. 1-15.

"Cadmium Free Quantum Dots", Nanoco Technologies, http://www.nanotechnologies.com/what-we-do/products/cadmium-free-quantum-dots, Copyright 2015 Nanoco Group plc, downloaded May 4, 2015, pp. 1-3.

"Primary color", from Wikipedia, http://en.wikipedia.org/wiki/Primary_color, downloaded May 4, 2015 pp. 1-9.

U.S. Appl. No. 14/996,955, filed Jan. 15, 2016.

* cited by examiner

QUANTUM DOTS ARE EXPOSED OVER ALL THE SURFACE OF THE PAINT

FIG. 3

QUANTUM DOTS ARE PARTIALLY OR TOTALLY FILTERED (COVERED) WITH FADED PAINT PAINT

EXTRACTING INFORMATION FROM SURFACE COATINGS

CROSS-REFERENCE TO RELATED APPLICATION

This application is a continuation of copending U.S. patent application Ser. No. 14/996,955, filed Jan. 15, 2016, now U.S. Pat. No. 9,460,328, issued Oct. 4, 2016, the entire contents and disclosure of which are hereby incorporated herein by reference.

BACKGROUND

This invention generally relates to extracting information from surface coatings. More specifically, the invention relates to using quantum dots to embed information in and to extract information from surface coatings.

It is often very useful to mark objects or to provide objects with markings that give useful or helpful information. For instance, many items in stores are marked with bar codes that identify, among other features, the price and the manufacturer of the items.

SUMMARY

Embodiments of the invention provide a method and system for extracting information from a surface coated with a coating containing quantum dots. In embodiments, the method comprises charging the quantum dots in the surface coating, scanning the surface to retrieve information from the charged quantum dots, and processing the retrieved information from the charged quantum dots to identify data encoded in the quantum dots.

In embodiments of the invention, the processing the retrieved information includes filtering the retrieved information to adjust the received information based on defined effects of the coating.

In embodiments of the invention, the quantum dots include a plurality of different types of quantum dots, and the processing the retrieved information includes processing the retrieved information to distinguish between the information retrieved from the different types of quantum dots.

In embodiments of the invention, the quantum dots include a plurality of specified types of quantum dots, each of the plurality of types of quantum dots is mixed in the coating in an associated relative amount, and the processing the retrieved information includes processing the retrieved information to determine the relative amount of each of the plurality of types of quantum dots mixed in the coating.

In embodiments of the invention, in response to the charging, the quantum dots emit light at a plurality of wavelengths; the scanning includes receiving the light emitted by the quantum dots at the plurality of wavelengths; and the processing the retrieved information includes processing the received light emitted by the quantum dots to determine a relative amount of the quantum dots that emit the light at each of the plurality of wavelengths.

In embodiments of the invention, the processing the received light includes filtering the received light to counter effects of the coated surface.

In embodiments of the invention, the scanning includes scanning a specified area of the surface, and the processing the retrieved information includes determining a count of a number of the quantum dots in the specified area of the surface.

In embodiments of the invention, the method further comprises illuminating the surface with a first light; and the charging the quantum dots includes illuminating the surface with a second light to charge the quantum dots to emit light; the scanning includes scanning the surface while the surface is illuminated with the first light to determine a color of the surface, and scanning the surface while the surface is illuminated with the second light to retrieve the light emitted from the quantum dots; and the processing the retrieved information includes adjusting the retrieved information from the quantum dots, based on the color of the surface, to determine one or more colors of the light emitted from the quantum dots.

In embodiments of the invention, information is embedded in the quantum dots in the form of a multi-color code having multiple color values, and the processing the retrieved information includes determining the multiple color values of the multi-color code embedded in the quantum dots.

In embodiments of the invention, the coating is a paint having a specified color, and the processing the retrieved information further includes using the determined multiple color values to identify the specified color of the paint.

In embodiments, the system comprises a light source for charging the quantum dots in the surface coating, a scanner for scanning the surface to retrieve information from the charged quantum dots, and a processing unit for processing the retrieved information from the charged quantum dots to identify data encoded in the quantum dots.

In embodiment of the invention, the processing unit filters the retrieved information to adjust the retrieved information based on defined effects of the coating.

In embodiments of the invention, in response to the charging, the quantum dots emit light at a plurality of wavelengths; the scanner receives the light emitted by the quantum dots at the plurality of wavelengths; and the processing unit processes the retrieved light emitted by the quantum dots to determine a relative amount of the quantum dots that emit the light at each of the plurality of wavelengths.

In embodiments of the invention, the light source includes a first light source for illuminating the surface, and a second light source for charging the quantum dots to emit light; the scanner scans the surface while the surface is illuminated with the first light to determine a color of the surface, and scans the surface while the surface is illuminated with the second light to retrieve the light emitted from the quantum dots; and the processing unit adjusts the retrieved information from the quantum dots, based on the color of the surface, to determine one or more colors of the light emitted from the quantum dots.

In embodiments of the invention, the light source Illuminates a predetermined light spectrum on the coated surface of an area of a predetermined size, wherein quantum dots in the coated surface are excited to luminesce; and the processing unit analyzes a reflected light from the coated surface by applying a set of predetermined filters to identity as colors only the quantum dots that emit a specific color, determine a number of the quantum dots in said area of the coated surface, and determine encoded information from said determined number of the quantum dots in said area of the coated surface.

In embodiments of the invention, the method comprises illuminating a predetermined light spectrum on a coated surface of an area of a predetermined size, wherein quantum dots in the coated surface are excited to luminesce; analyzing a reflected light from the coated surface by applying a set of predetermined filters to identity as colors only the quantum dots that emit a specific color; determining a number of the quantum dots in said area of the coated surface; and determining encoded information from said determined number of the quantum dots in said area of the coated surface.

In embodiments of the invention, the set of predetermined filters provide a predetermined tolerance for chromatic deviation due to the coated surface comprising the quantum dots.

In embodiments of the invention, the determining encoded information includes comparing the determined number of the quantum dots to a set of predefined data cubes, wherein an index of the data cubes is determined by a color label tagged on each of the data cubes.

In embodiments of the invention, data stored within the data cubes are accessed by a color of the quantum dots, then by a hue of the quantum dots, and then by a count of the quantum dots.

In embodiments of the invention, the coating is a paint comprised of a base of white and one or more color pigments; the method further comprises forming the coating by mixing the one or more of the pigments in the base, including providing each of the pigments with a specified amount and type of quantum dots representing the color of the pigment; and the determining encoded information includes determining the colors of the one or more pigments from the determined number of the quantum dots in said area of the coated surface.

Embodiments of the invention may be used in a wide range of applications.

As an example, embodiments of the invention may be used to detect the original color of a paint. In embodiments of the invention, this may be based on electrically charging and scanning surfaces coated with quantum dot paints to determine percentages of use of primary colors in the paint.

Due to climate, time, and use factors, the color of a paint used for coating a surface tends to degrade, and there is no method to accurately and precisely obtain the original color of the paint just by scanning the painted surface. A person could try to get the purchase order for the original paint with the specification of the color, but the purchase order is not always available; and even if the original purchase order is available, different paint providers could misinterpret the original color codes or formula or names of paint due to different nomenclatures being used by different providers.

Also, a person could pull off a part of the paint and carry that part to a paint store for someone at the store to look at. This, however, is very invasive of the painted surface, and, moreover, does not guarantee that the original color of the paint can be correctly identified due to the factors to which the painted surface could have been brought under or subjected to.

In one embodiment, the invention is used to extract the original color from a coated surface. This embodiment comprises scanning parts of a surface (filtering and chromatic aberration are fixed), measuring the magnitude of the light in the sample of each principal color, determining the percentage of each color according to its magnitude, and translating these percentages to the number of QDs over a base number of QDs per area.

In another embodiment, the invention is used to extract encoded multidimensional information from a coated surface. This embodiment uses QD mixtures, each of them in RGB colors with one specific hue for each color. The color represents an axis or dimension in a multidimensional data structure and the hue represents the specific index in the dimension. The combination of hue values into the dimensions (basically, a coordinate x,y,z) works as a pointer to data or an object into the data structure. The number of QDs in the mixture can work as a parameter to the data or object in the x,y,z position.

This embodiment comprises scanning parts of a surface (filtering and chromatic aberration may be fixed), getting the hue numeric values of the QDs in the sample, and classifying each color in the RGB according to the hue ranges in an x,y,z scale. According to a predefined multidimensional data structure, R, G and B may be set for an axis. For example, R is the x axis, G is the y axis, and B is the z axis. The hue value of each color is used to index the multidimensional data structure into the corresponding dimensions.

The data or object in the pointer x,y,z, is obtained and processed. A data object can be retrieved. A function object can be executed (using the above-described method, for example, to extract the numbers of QDs and to pass the count as a parameter to the function). A pointer object can redirect to a bigger datasource, service or system.

DETAILED DESCRIPTION

Embodiments of the invention provide a method and system for embedding information in and extracting information from surface coatings. Generally, this is done by mixing quantum dots in the coatings in a way that represents encoded information.

When the coating is on a surface, the coating is inspected and the quantum dots in the coating are analyzed to determine the code that the quantum dots represent, and this code is then used to identify the encoded information.

For example, the code may be determined by the numbers of quantum dots of different sizes in the coating, or by other parameters of the quantum dots. The encoded information represented by the code may be the color of the coating or other parameters of the coating such as the manufacturer of the coating.

Quantum dot materials are luminescent inorganic semiconductor nanoparticle materials that emit light when appropriately excited by photo- or electro-excitation. The light emission of quantum dots is due to quantum confinement of electrons and holes. An advantage of quantum dots is that they can be tuned so that they emit any desired wavelength (color) as a function of their size, by using one material only and the same synthetic process. For example, in a nanoparticle size range of from about 2 to about 10 nm, one can obtain a full range of colors from the visible range of the spectrum. In addition, quantum dots posses improved fatigue resistance when compared with organic dyes. Another advantage of quantum dots is their narrow emission bands, which increases the number of possible wavelength choices for designing customized colors.

The quantum dots are mixed in a liquid, for example, paint, stain, or other sealant or mixture used for coloring, covering and/or sealing a surface, that is applied to a surface by, for example, brushing spraying or other topical applications used for painting, coating or sealing surfaces. The quantum dots may be mixed in the liquid in any suitable way. The quantum dots may be incorporated into the coating either directly individual particles, or as incorporated into a carrier matrix, which may be formed by a polymer, inorganic, organic, or metallic substrate.

A variety of types of coatings and a variety of types of quantum dots may be used in embodiments of the invention. For instance, as mentioned above, the coating may be a paint.

Paint colors are created by combining primary colors. When each of those primary colors contains associated quantum dots representing the respective primary colors, the combination of the paint colors has a set of scannable quantum dots at different rates. For example, for a blue paint created from a CYMK color schema, the set of scannable quantum dots would show that there is a combination of cyan and magenta.

Given, for example, a concentration of one million quantum dots per square meter in each of the primary colors, then a scanning on a 1/10 square meter of a surface coated with the blue paint would return approximately a rate of 50/50 for the cyan and magenta quantum dots—that is, 50% of the detected quantum dots would be quantum dots representing cyan, and 50% of the detected quantum dots would be quantum dots representing magenta. With this information, that original paint color can be recreated from the primary color percentages obtained, even if the original paint color degraded.

For this method, the quantum dots (essentially nanocrystals of certain semiconductors) are excited before the surface is scanned. This excitation makes the wavelength of the light emitted from a quantum dot controlled by the size of the nanocrystal particle and the level of confinement of the electrons within the particle. The mentioned excitation can be achieved by a scanner by introducing a small electrical charge on the scanned surface portion.

In embodiments of the invention, the scanner uses one or more filters to account for the distortion of the generated light by the thickness and color of the paint that contains the quantum dots. This filtering renders the original color of the paint as well as the percentages of the basic tints used to generate the original color. This also allows the user to see how the wear and environment have altered the paint over time.

Figure 1:
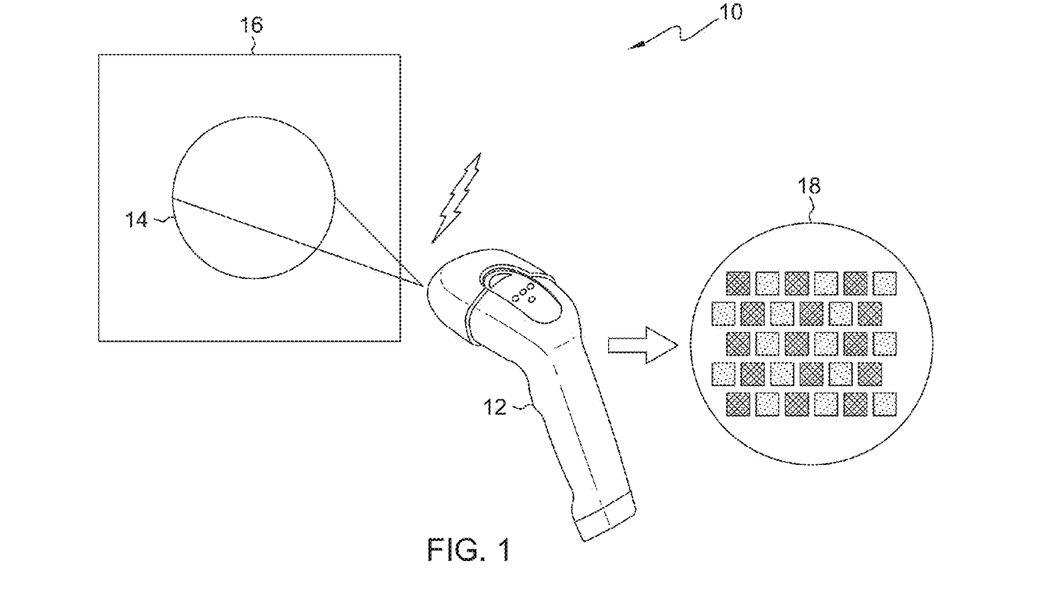
FIG. 1 illustrates an embodiment of the invention in which a painted surface is scanned to detect quantum dots in the paint.

FIG. 1 illustrates a scanning system 10 for extracting information in accordance with an embodiment of the invention. Generally, scanner 12 scans an area 14 of the painted surface 16 and detects the number of quantum dots representing cyan and the number of quantum dots representing magenta. This information is then used to determine the original color of the paint used to paint the surface.

As a pre-determined amount of quantum dots (QDs) is mixed for each of the major colors (CMYK), a readout, represented at 18, in any portion of the paint sample will give the percentage mix of the color components of the paint. As indicated above, the QD readout may be obscured by the paint itself. Therefore, to get a clear color readout of the QDs, the color of the painted surface is read optically and the "filtering effect" caused by the paint color itself is discarded. This results in the correct readout of the paint color as given by the QD wavelength readout.

Figure 2A:
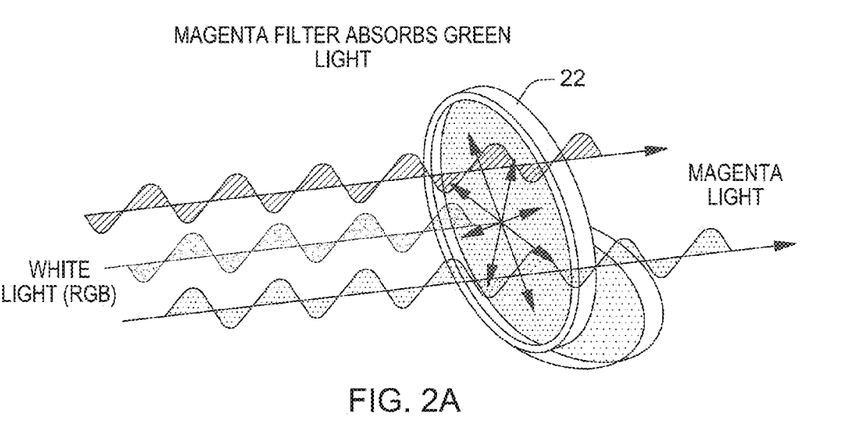
FIG. 2A illustrates an example of how paint can work as a filter, affecting the wavelength of light emitted by quantum dots in the paint.
Figure 2B:
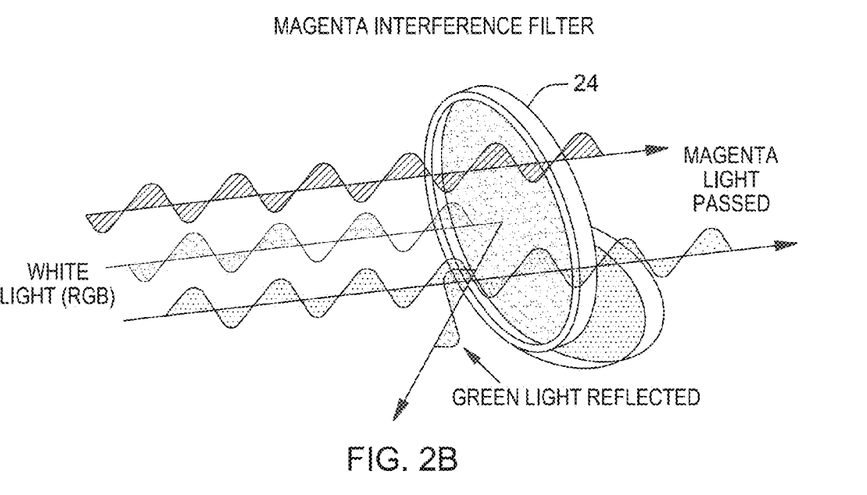
FIG. 2B shows another example of how paint can affect the wavelength of light emitted by quantum dots in the paint.

In embodiments of the invention, a filtering effect is generated by the color of the paint itself. FIGS. 2A and 2B are examples of how a paint could work as a filter, affecting the light wavelength (color) emitted by the quantum dots that are partially or totally coated by the paint. As illustrated in FIG. 2A, white light (RGB) is directed onto filter 22. The filter absorbs green light, and the magenta light passes through the filter. As shown in FIG. 2B, the filter 24 reflects the green light, and magenta light passes through the filter.

The filtering effect of the paint needs to be counteracted in order to properly read the data. Since the Optical filters are completely described by their frequency response, and the media works as an absorptive filter, we can calculate by the current color of the paint, how the paint color affects the wavelengths we are interested in. By using a digital filtering technique, the data can be read without needing to directly count all of the QDs per square inch, and rather by identifying the magnitude of the response to a UV light input or an electrical charge to the area being scanned. FIG. 2 is a general illustration of this filtering technique 20.

Note that each of the two above-mentioned techniques for stimulating the UV light will use a different magnitude base to determine the amount of QDs per square inch per light frequency, as the electrical stimulation will generate some "bleed through" of QDs in lower levels of the paint coating, whereas the UV readout will not have that level of penetration into the media.

Digital Filters are used so only the correct wavelengths are read, comprised of the addition of all of the wavelengths generated by the QDs of the same type under the influence of the UV or electrical stimulation. This means that the method needs to correct any unwanted wavelengths generated by the QD light shining through the coats of paint that act as filters, and as mentioned above, this is needed so a correct value can be read. For this, a simple filtering can be used by correcting with the same visible color being used as the assumed absorbed wavelengths.

Figure 3:
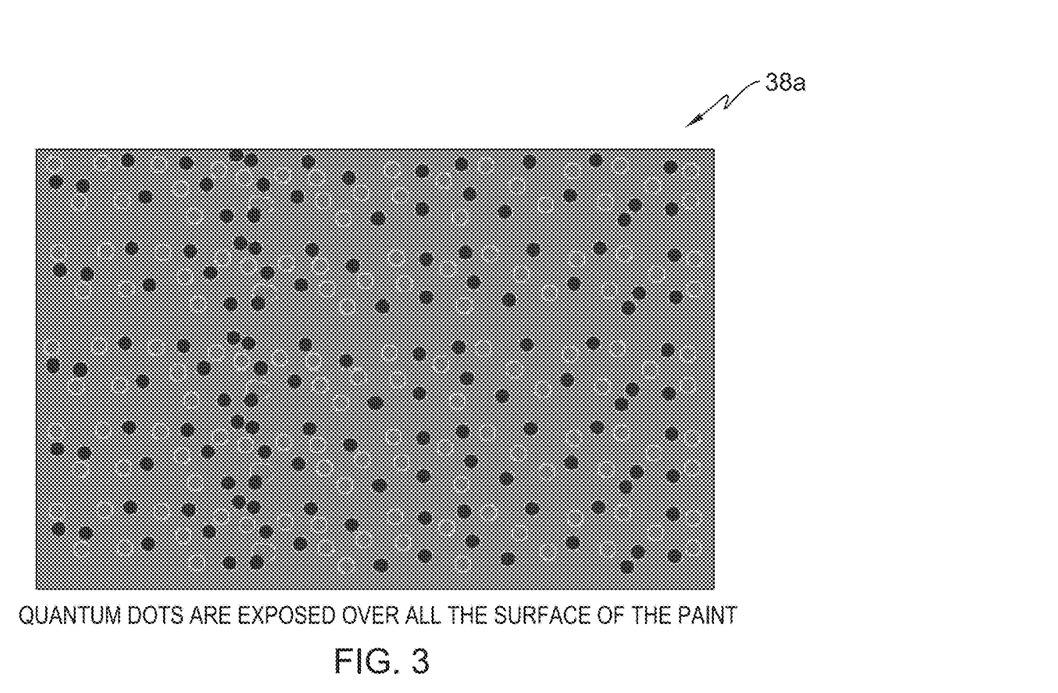
FIG. 3 shows a paint sample in which quantum dots are exposed over the surface of the paint.

The filtering effect is especially important for extracting the original color from coated surfaces, since the QDs are going to be mixed with the paint of the color they represent. An optimal scenario of a paint is one where the QDs are all exposed over the surface of the paint, subsequently it is easier to process the scan. FIG. 3 represents this scenario at 38a.

Figure 4:
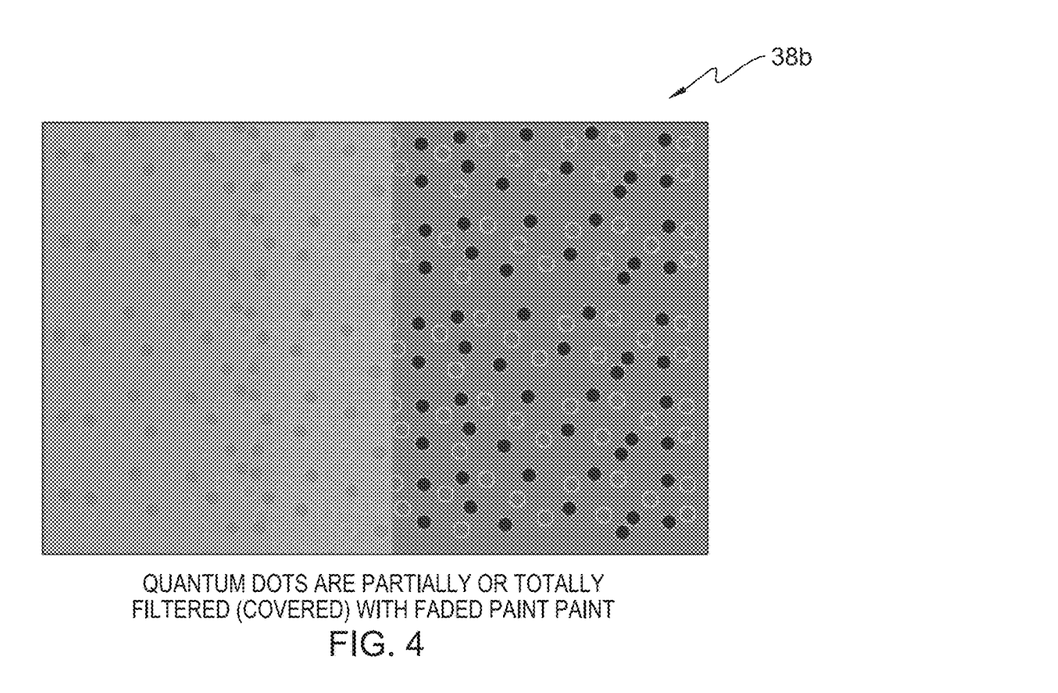
FIG. 4 shows a paint sample in which quantum dots are partially or totally filtered (covered) with faded paint.

But the real scenario, like in FIG. 4 at 38b, is one where the QDs are partially or totally filtered (covered) with faded paint, which may imply its real wavelength is also hampered partially. Therefore the digital techniques mentioned above are applied in order to correctly interpret the samples.

Figure 5:
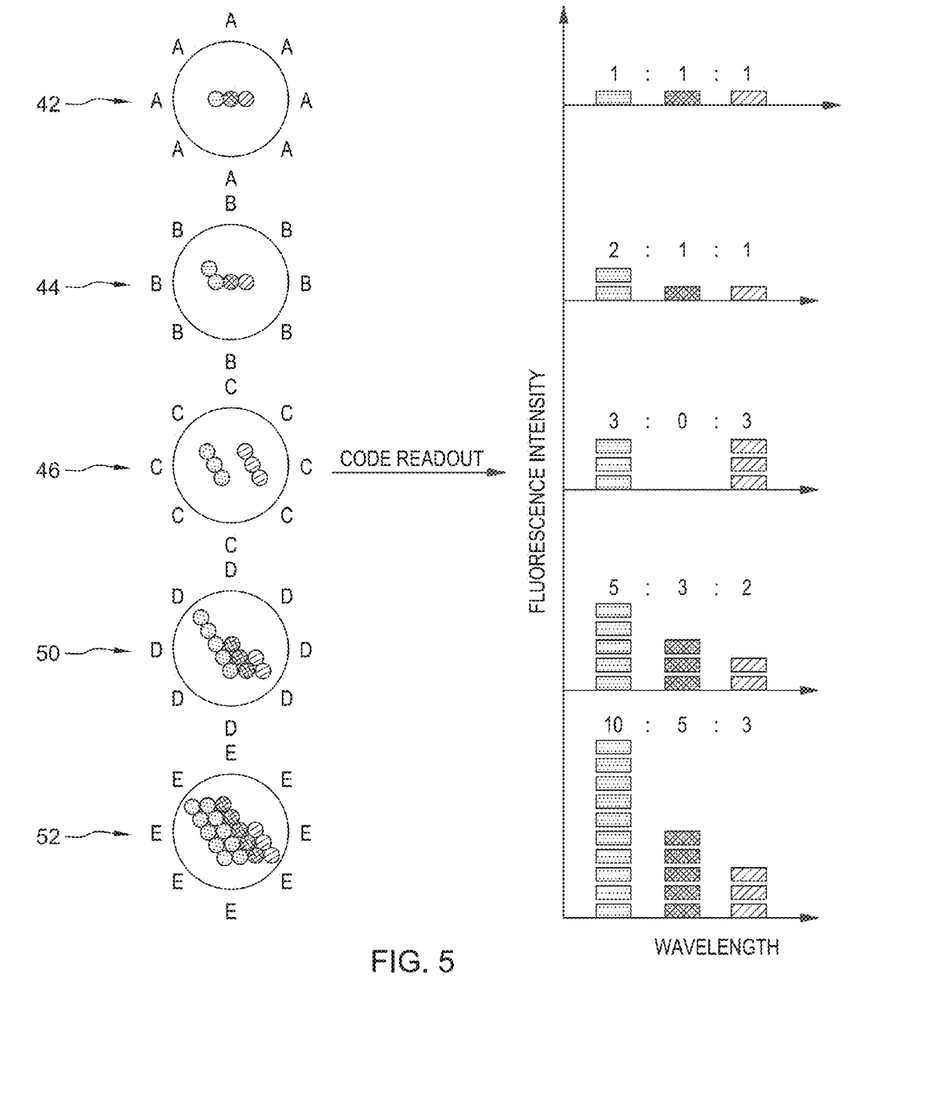
FIG. 5 depicts several quantum dot readouts from a painted surface filtered to obtain corrected color readouts.

FIG. 5 shows several optical color readouts and associated, filtered QD readouts. Specifically, FIG. 5 shows, for each of these color readouts, the intensities of the QD generated light in the color readout at each of three wavelengths and the ratio of these intensities. For color readout 42, the ratio of the intensities of the QD light at these three wavelengths is 1:1:1. For color readout 44, the ratio of the intensities of the QD light at the three wavelengths is 2:1:1; and for color readout 46, the ratio of the intensities of the QD light at these three wavelengths is 3:0:3. For color readout 50, the ratio of the intensities of the QD light at these three wavelengths is 5:3:3; and for color readout 52, the ratio of the intensities of the QD light at the three wavelengths is 10:5:3.

FIGS. 6-9 illustrate principles of the filtering technique in more detail.

Figure 6:
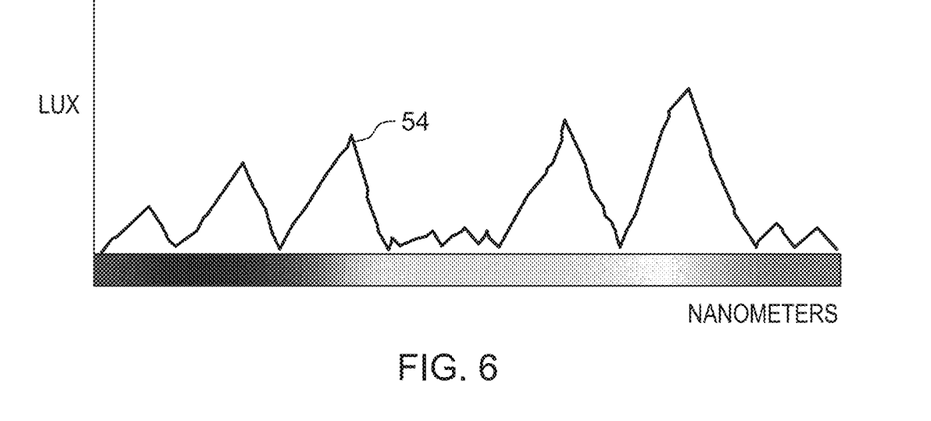
FIG. 6 shows the results of an initial paint scan in an embodiment of the invention.
Figure 7:
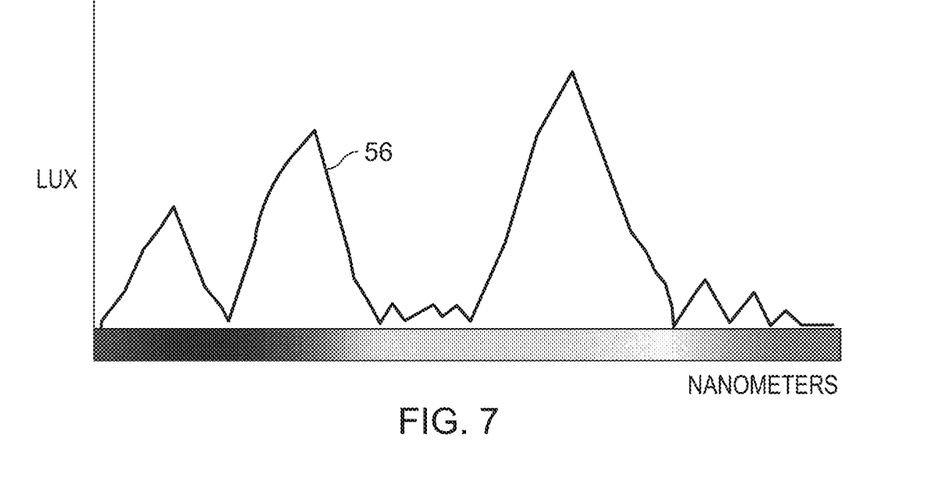
FIG. 7 illustrates the count of quantum dots in distinct colors in an embodiment of the invention.

FIG. 6 shows at 54 the results of an initial paint scan. This scan is performed to get the set of current colors that may be obstructing (filtering) the real QDs color in deeper layers. As shown in FIG. 7 at 56, a count is obtained of QDs in distinct colors after charging them. Some QDs wavelength will be filtered by the paint, so this measure has to be corrected.

Figure 8:
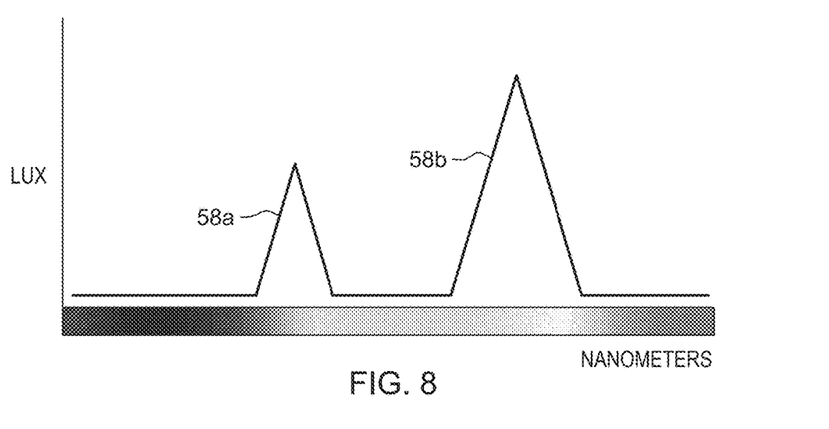
FIG. 8 shows a filter example based on the scanned images of FIGS. 6 and 7.

The next step is reverse filtering applying the initial paint scan over the QD scan. The filter is obtained by determining how inversely the paint affects QD color.

Figure 9:
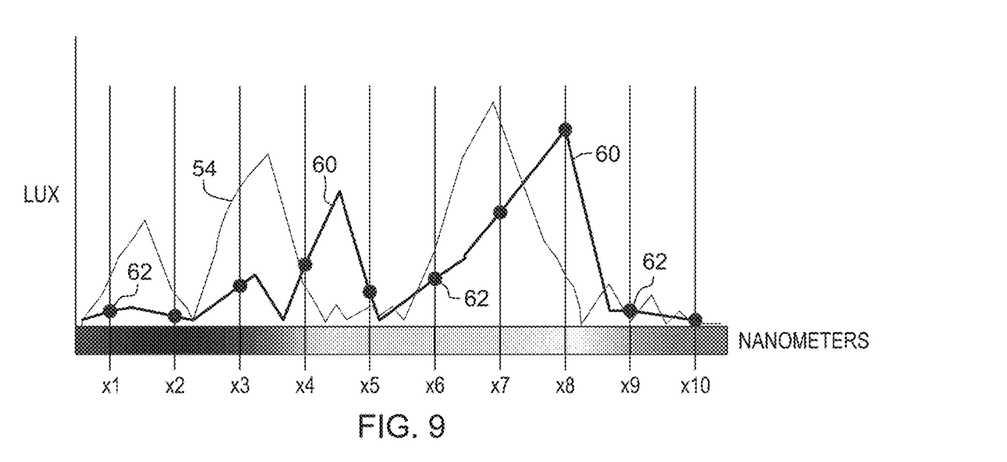
FIG. 9 shows a new filter applied over the quantum dot readout of FIG. 7.

FIG. 8 is a filter example based on the previous scan images. There are mainly two wavelength ranges (the peaks) 58a and 58b affected by the paint filtering. As shown in FIG. 9, the new filter is applied over the QD scan (gray line) 54. The black line 60 is the corrected QD count. This is an example of QD correction based on the previous examples of QD count by color and filter.

The lines $x_1$ to $x_{10}$ represents the colors (or wavelengths) of QDs known to exist in the paint. Following the example, the green points 62 at the $x_1$ to $x_{10}$ lines represent the number of QDs for each color in a squared inch: $x_1=2$, $x_2=0$, $x_3=8$, $x_4=14$, $x_5=5$, $x_6=10$, $x_7=20$, $x_8=30$, $x_9=1$, $x_{10}=0$.

The total sum is 90 QDs. If a concentration of 100 QDs per square Inch is assumed, 10 QDs are missing; however, the "color" is derived from the percentages of the QDs found in the sample. The tone (how light or dark) is derived from the difference between the expected 100 QD per square inch and the 82 color definition QDs registered. This calculation is based on 82. Since there may be additional QDs in the paint that relate to metadata (year and manufacturer, as an example), not all of the QDs may be relevant to the color of the paint. So in this example, it is stipulated that $x_1$, $x_5$, $x_9$ are the respective markers for a paint or tint manufacturer, base type and year of manufacture.

This will yield the exact color, as the tint and base manufacture processes and formulas may vary between the years and manufacturers. This will give the most accurate measurement of the original color of the paint that had been applied. Also, the expected amount of QDs is based on these "key" QDs found, as this is the only known amount (For example, all manufacturers must place 854000 QDs of their id per gallon of paint . . . ) which will give a known reading to make the necessary mathematical calculations as shown. Therefore:

$x_1 \rightarrow$ Manufacturer ID=2
$x_5 \rightarrow$ Base type ID=5
$x_9 \rightarrow$ Year of manufacture ID=1

Now, with the rest of 82 x's QDs, the correct combination is found using cross multiplication to find the exact percentage of each color of QD in the paint:

$x_3 \rightarrow 8 \times 100/82 = 9.76\%$
$x_4 \rightarrow 14 \times 100/82 = 17.07\%$
$x_6 \rightarrow 10 \times 100/82 = 12.20\%$
$x_7 \rightarrow 20 \times 100/82 = 24.39\%$
$x_8 \rightarrow 30 \times 100/82 = 36.59\%$ This is the concentration of each color of QD in a paint after filtering, for a given manufacturer, base and year.

Figure 10:
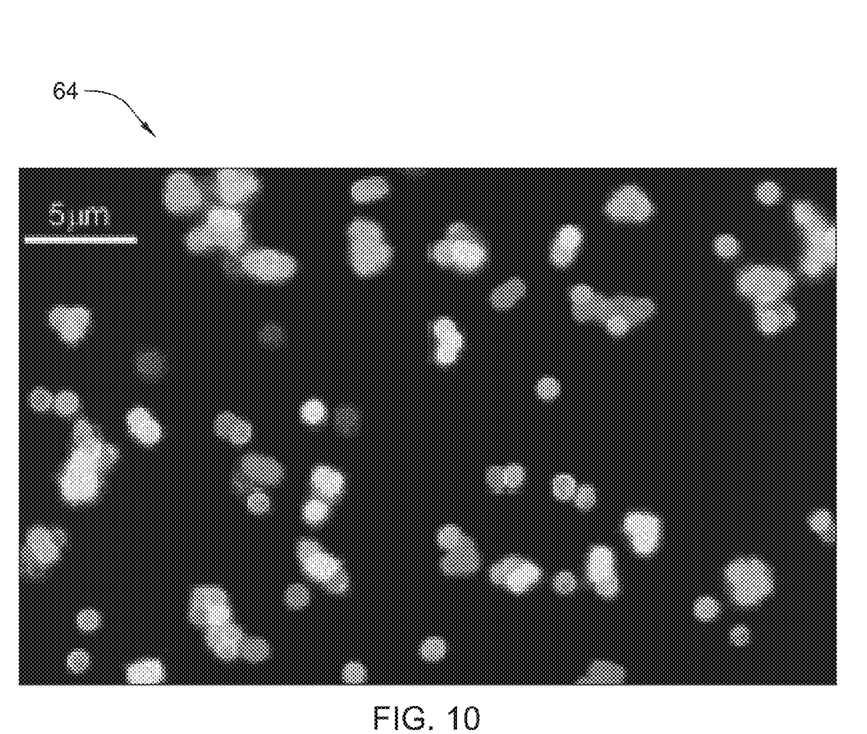
FIG. 10 illustrates an enlarged view of an area of a painted surface and showing quantum dots in the paint.

Embodiments of the invention also take into account that the readouts give the amount of QDs in each color component of the paint, and it may be helpful or necessary to compare this amount to a baseline to determine the amount of that color component in the original paint. FIG. 10 illustrates an enlarged area 64 of a painted surface showing light from several types of quantum dots.

The amount of pigment that was originally included in the base color can be calculated from the amount of the QDs of each color per square inch of the painted surface. This calculation can be done by means of a comparison against a known baseline table. For example, one unit of pigment in one gallon of paint should yield a pre-determined amount of the QDs in that pigment in a specified area of a surface painted with that paint. This gives a realistic readout of the original amount of the pigment that was included in the paint used to paint the sample, and from this, the original color of the paint can be re-created.

Figure 11:
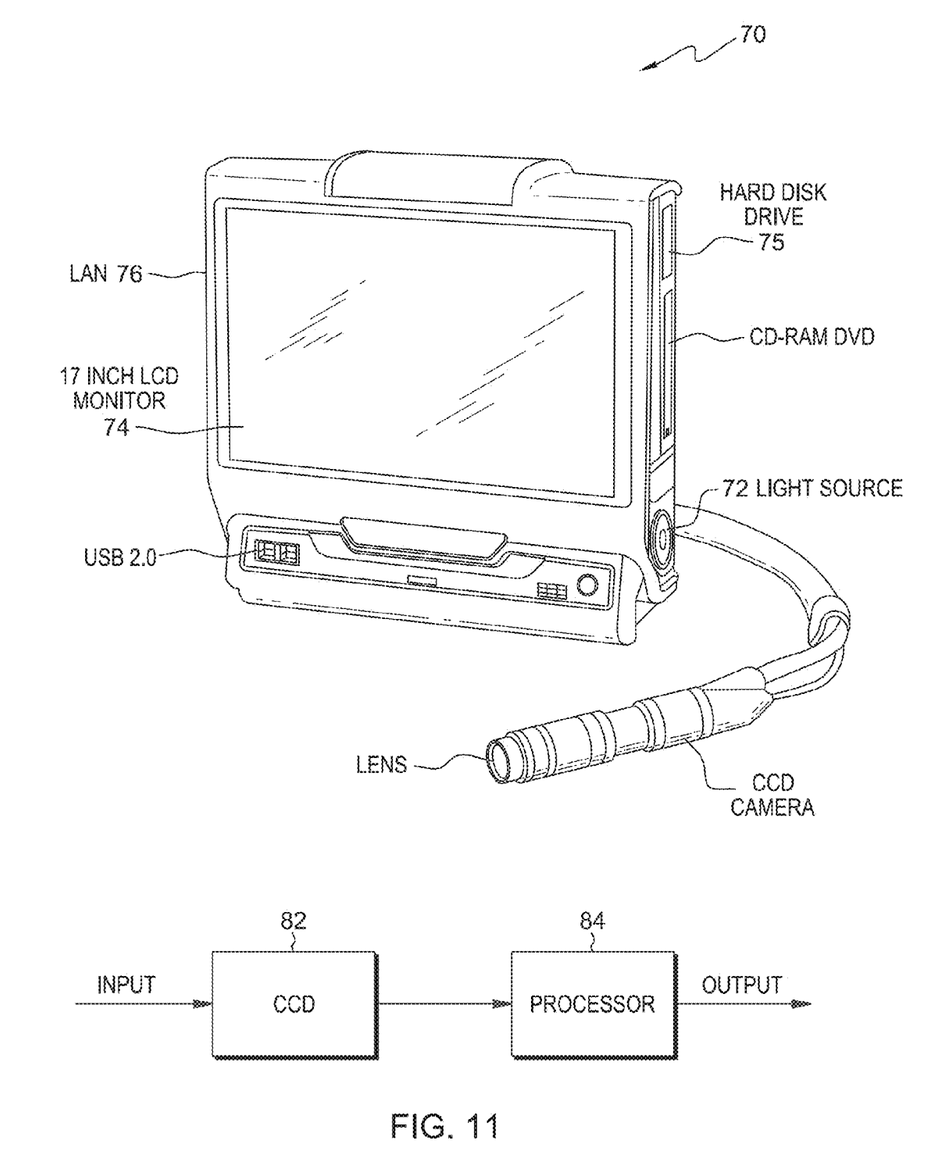
FIG. 11 shows a portable microscope that may be used in embodiments of the invention to scan an area of a painted surface.

FIG. 11 illustrates a reader 70 that may be used in embodiments of the invention. This reader includes light source 72, LCD monitor 74, LAN connection 76, and hard disk drive 78. Also, as schematically illustrated in FIG. 1, the reader includes a CCD camera 82, and a processor 84 for processing the output of the CCD camera. To avoid environmental issues, the reader 70 may be a portable microscope that has two types of light—white light and black light. Under the white light, the reader determines the visible color of the sample, also referred to as the "filter color." Then, the black light is used to make the QDs fluoresce, and the system counts the amount of QDs by wavelength (after applying the "unfiltering" by digital means). As there is no need for human visual inspection of the QD count, the microscope does not need to be as powerful as it would need to be if there was human inspection, given the CCD camera can capture the data and the processor in the main housing is able to identify through the video feed the amounts of QDs in the field of view. In embodiments of the invention, the microscope is a fixed-focus device.

Embodiments of the invention embed useable data on any solid object by means of its paint or other suitable surface coating. Many objects currently make use of QR or bar codes to be read, but this relies on having to label the product. Embodiments of the invention allow the paint on the object itself to be the label or QR code.

This can be done using the following procedure. A data cube is generated with the appropriate variables to be able to define the desired data. The cube is then tagged with a specific color label (for example, RGB 10,5,250). Since the visible spectrum is divided into millions of colors, embodiments of the invention are only limited by the capacity of a user to determine the difference between one color and the next color within the spectrum.

As paint has the ability to sustain and even protect Quantum Dots, those dots are embedded in the paint that is used to coat the surface of the object. The Quantum dots that are mixed in a pre-determined quantity in the pigments used to generate the paint have a rather uniform distribution, and the quantum dots can be used to tag the object in a permanent way, and can be used in a variety of situations.

Sample Use Cases

Paint Color

The data can be used to encode the paint color. For example, a person may want to paint his or her house with the exact same color that the house had when the house was new. However, the paint color may have faded, or washed out, and the person needs to know the correct manufacturer and recipe used to generate the color of the original paint.

The desired information can be obtained by reading the quantum dot signature on the wall the person wants to paint (in any point on the wall). More particularly, the RGB proportions used to generate the paint color can be determined by means of a count of the amount of dots of each color per square inch, for example, of the paint itself. An additional dot can be used to determine the manufacturer. This additional dot is referred to as "the cube tag."

For instance, the hue of the red color dots may be used to define the year of creation of the paint, the hue of the green color dots may be used to determine the type of the paint, and the blue hue may be used to determine the manufacturing plant of the paint. The amount of red, green and blue hue dots may be used to determine the original mixture of paint colors.

This allows for immediate identification of the exact color, recipe of the paint, and for even more information than what is normally embedded in bar codes used today.

Forensics

Paint transfer can also be used to determine where any part of a paint that is being analyzed came from by being tagged with the paint's manufacturer, year of manufacture, make and model. This information is usually sufficient to enable a person to obtain, or bring up, any specifications on the paint.

By adding additional tags or sub-dividing the hues, a person may be able to get more granular data directly embedded into the paint of the object in question, thus giving the paint a unique identification, referred to as the fingerprint or DNA of the paint.

A Device

In embodiments of the invention, the amount of outside light interference is kept low. To reduce the amount of outside light interference, the tip of the device is placed against the paint surface. This also guarantees that the area being scanned is constant.

Due to the size of the Quantum Dots, and the purpose for which the dots are being used, the device, in embodiments of the invention, contains a fixed focus microscope and a high resolution scanner with, for example, 4500× magnification.

To reduce the weight and complexity of the device, the device may have a predetermined focal length, so the device will be lighter, cheaper to produce, and provide reliable readouts in every scan. This will also require that the device be placed flush against the surface being read.

Design Characteristics

1) Light

In embodiments of the invention, black light bulbs or UV leds may be used. One is integrated in the light source. The white led is turned on for the surface color scan, and then the UV led is turned on for the other scan.

2) Zoom

Typical commercial USB microscopes offer magnification range between 10×-800×. An example is the AGPtek®USB 800× Digital Microscope endoscope 2 MP 8 LED Compatible with Windows and MOX OS 10.5 or above For Micro-measure Work.

Typical student optical microscopes offer a magnification range between 40×-1000×. An example is the 40×-1000× All-Metal Optical Lens Compound microscope Student Home School Science.

Another example of a microscope that can be used in embodiments of the invention is the 40×-2500× Infinity Extreme Widefield EPI-Fluorescent Microscope. This microscope has a magnification up to 2500×, which lowers the needed digital zoom to 4× or lower, which is currently standard software in most digital video cameras.

Embodiments of the invention do not require the complete microscope. The build cost can be reduced by eliminating the additional lenses, the movable focus and the binocular tower, leaving a wand-like setup that is directly connected to the camera.

A digital zoom can be used, as it is not necessary to see the quantum dots clearly. The dots only need to be counted. This can be done by polarizing or filtering the signal and counting the total light emitted in the frequency range of interest, or actually counting the dots by means of software for video analytics.

To accomplish the task with the lowest or lower cost, embodiments of the invention may use a lens that works at least for the 100× optical zoom and a 5× digital zoom over this. This should reduce the cost down enough to make the device a reasonable build. It may be useful to test the device to ensure that this is actually so. Taking advantage of the fact that it is not required to see in great detail, as it is necessary only to read the cores of the dots, it is acceptable to have fuzzy dots as long as the dots can be counted and classified.

Reading Quantum Dots (QDs) from Paint and Determining Color

The device can be considered as a document scanner. The device shines a predetermined light spectrum on the area to be scanned, and recognizes the reflected light as shapes or color. In this case, a black light is shined on the dots, and the dots are energized and light up as little light bulbs that twinkle (turn on and off). In embodiments of the invention, the system has four filters and will identify only the dots that emit a specific color. Since the dots are in mediums that have colors by themselves, the system needs to account for the chromatic deviation due to the paint these dots are fixed in. This allows the system to count the amount of dots per color in the scanned area.

In optics, chromatic aberration (CA, also called achromatism, chromatic distortion, and spherochromatism) is an effect resulting from dispersion in which there is a failure of a lens to focus all colors to the same convergence point. It occurs because lenses have different refractive indices for different wavelengths of light. The refractive index of transparent materials decreases with increasing wavelength in degrees unique to each.

Figure 12:
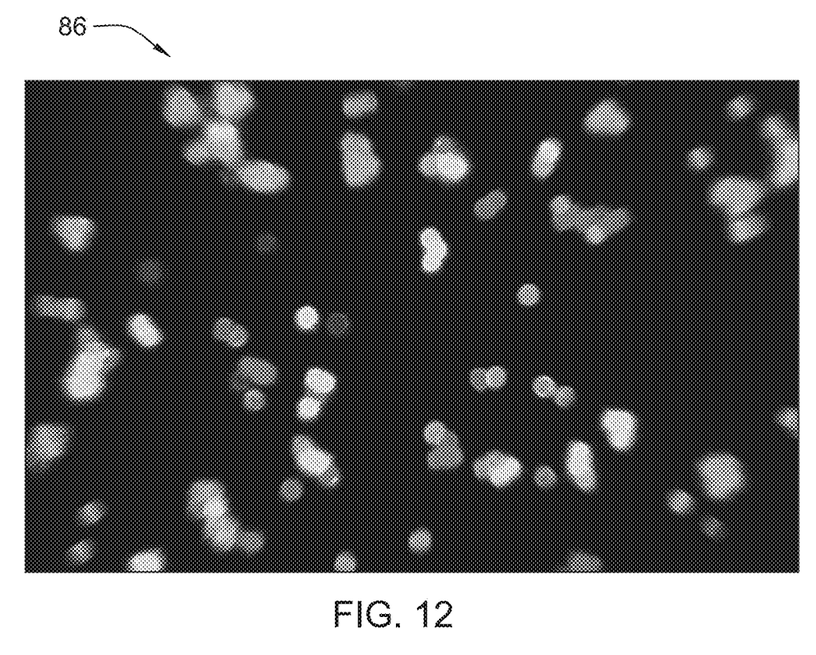
FIG. 12 illustrates an image of a scanning of quantum dots with chromatic aberration.
Figure 13:
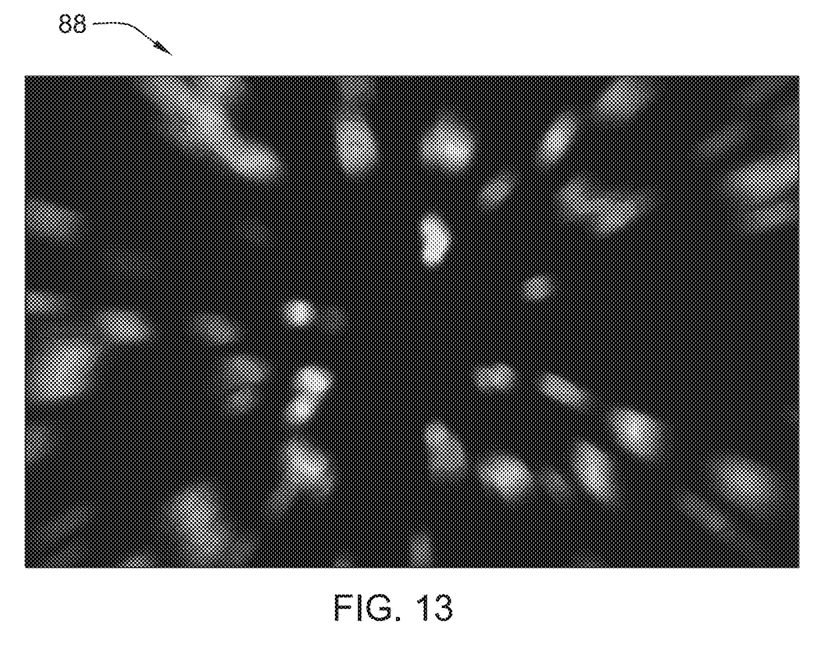
FIG. 13 shows another image of a scanning of quantum dots with chromatic aberration.

FIGS. 12 and 13 show images 86 and 88 of a scanning of quantum dots with chromatic aberration. It makes QD counting more difficult, or impossible in the case of the image 88.

Chromatic aberration manifests itself as "fringes" of color along boundaries that separate dark and bright parts of the image, because each color in the optical spectrum cannot be focused at a single common point. Since the focal length f of a lens is dependent on the refractive index n, different wavelengths of light will be focused on different positions.

With reference to FIG. 12, the total amount of each color may be correct, but not in the right location, making the picture color be totally distorted. This may make the "count" of QDs per square inch to be difficult if not impossible, based on the wide variety of frequencies in the optical spectrum. A way to address this is to use the magnitude of the light rather than the count itself, but this requires filtering out any unwanted light waves so the magnitude (amount of Lux) on the specific wavelength is correctly measured.

As paint is typically generated as a white base plus different pigments, it is only needed to tag the pigment that is being added to the base. For example, a baseline of one ounce or one millimeter or one gram of pigment may be added per gallon of base paint (this will also calibrate the sensitivity of the scanner, since the scanner will only read to a specific depth within the material being scanned). The recipe of the paint can be recreated from the readout.

QDs are graded by their luminescence when they are manufactured. Higher quality QDs will provide higher luminescence response upon either being excited by electrical means or being subjected to ultraviolet light. This also takes into consideration that it is undesirable to place a large amount of the QDs in the pigment to avoid having luminescence issues for the normal eye when the paint is illuminated under a black light. The size of the QD will determine its color and not its brightness. Using a low enough amount of QDs in the pigment should also avoid issues with clustering, making readouts simpler.

The device, even though it is a hand held device, is pressed flush against the surface being scanned. This will remove or reduce any interference from outside light sources and also reduce the complexity of the optics, as there is no need to be concerned about the focus (which is a narrow field due to the magnification requirements). Additionally, pressing the device flush against the surface will make the scan area uniform (there is no need to scan the complete wall—the desired reading can be taken by scanning only a point on the wall with the color that needs to be identified). By making the scan area a one inch square, for example, a representative sample of the dots can be obtained.

In embodiments of the invention, the device has a predetermined focal length, and therefore the device will always read the same area. This avoids reading different size areas; for example, eight square inches one time, and four square inches the next time. In embodiments of the invention, a larger area can be scanned. The system looks for the density of the dots. By using a multiplexed QD reader, the system is able to (a) get the amount of QDs per type (wavelength) and (b) input the scan area for the device to be able to calculate the correct color intensity. Scanning a larger area would make the readout print a more intense version of the color used, as the pigment percentages would be maintained, but the total amount of pigments would be multiplied.

Data Model

Data cubes are very useful in managing huge amounts of co-related data with a three-dimensional construct.

Embodiments of the invention make use of an index of data cubes determined by the color label that is tagged on each cube by the manufacturer.

In embodiments of the invention, it does not matter what the variables used are, or what the data contained in the cubes is. It only matters that the cube is tagged properly, so the cube can be referred back to upon scanning.

It is only necessary to refer back to the proper cube by "color", then by QD Hue, then by QD count to find any data that has been stored within the embedded data cubes.

Figure 14:
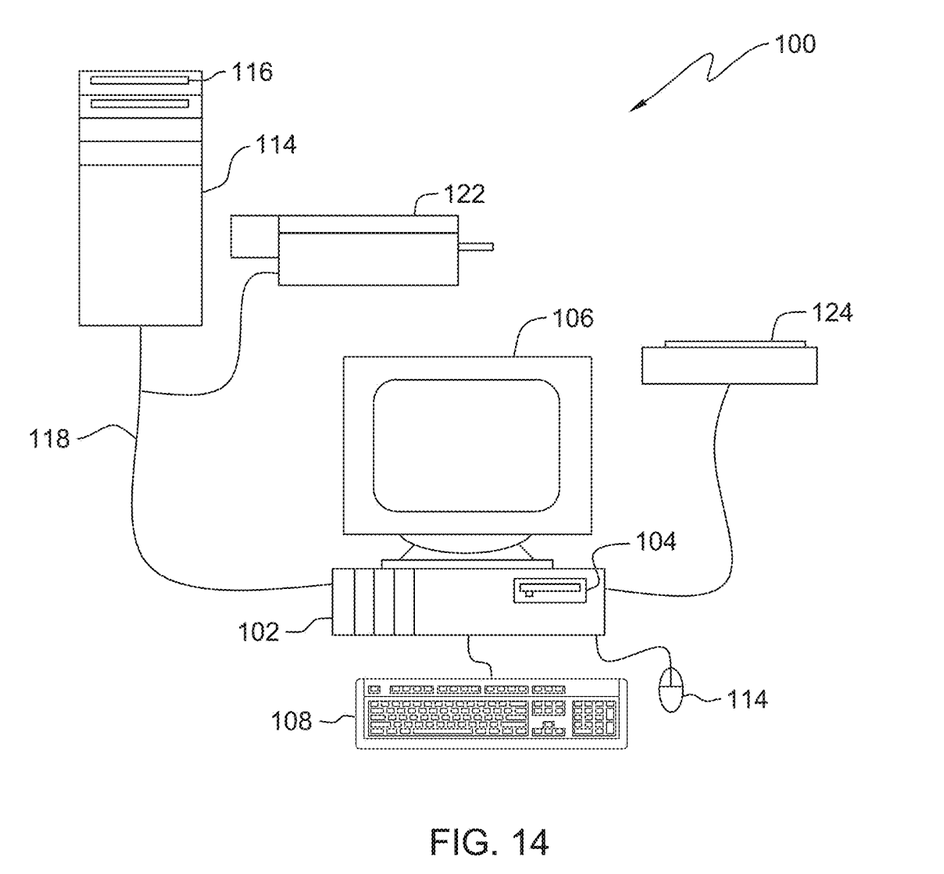
FIG. 14 shows a computing environment that may be used in embodiments of this invention.

A computer-based system 100 in which a method embodiment of the invention may be carried out is depicted in FIG. 14. The computer-based system 100 includes a processing unit 102, which houses a processor, memory and other systems components (not shown expressly in the drawing) that implement a general purpose processing system, or computer that may execute a computer program product. The computer program product may comprise media, for example a compact storage medium such as a compact disc, which may be read by the processing unit 102 through a disc drive 104, or by any means known to the skilled artisan for providing the computer program product to the general purpose processing system for execution thereby.

The computer program product may comprise all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit 102, as mentioned, or may be located on a remote system such as a server 114, coupled to processing unit 102, via a network interface 118 such as an Ethernet interface. Monitor 106, mouse 114 and keyboard 108 are coupled to the processing unit 102, to provide user interaction. Scanner 124 and printer 122 are provided for document input and output. Printer 122 is shown coupled to the processing unit 102 via a network connection, but may be coupled directly to the processing unit. Scanner 124 is shown coupled to the processing unit 102 directly, but it should be understood that peripherals might be network coupled, or direct coupled without affecting the performance of the processing unit 102.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of extracting information from a surface coated with a coating containing quantum dots, the method comprising:
charging the quantum dots in the surface coating;
scanning the surface to retrieve information from the charged quantum dots and to determine a color of the surface; and
processing the retrieved information from the charged quantum dots, including adjusting the retrieved information based on the determined color of the surface, to identify data encoded in the quantum dots.

2. The method according to claim 1, wherein:
the processing the retrieved information includes filtering the retrieved information to adjust the received information based on defined effects of the coating.

3. The method according to claim 1, wherein:
the quantum dots include a plurality of different types of quantum dots; and
the processing the retrieved information includes processing the retrieved information to distinguish between the information retrieved from the different types of quantum dots.

4. The method according to claim 1, wherein:
the quantum dots include a plurality of specified types of quantum dots;
each of the plurality of types of quantum dots is mixed in the coating in an associated relative amount; and
the processing the retrieved information includes processing the retrieved information to determine the relative amount of each of the plurality of types of quantum dots mixed in the coating.

5. The method according to claim 1, further comprising:
illuminating the surface with a first light; and wherein:
the scanning includes scanning the surface while the surface is illuminated with the first light to determine the color of the surface, and
the processing the retrieved information includes adjusting the retrieved information from the quantum dots, based on the color of the surface, to determine one or more colors of the light emitted from the quantum dots.

6. The method according to claim 5, wherein:
the charging the quantum dots further includes illuminating the surface with a second light to charge the quantum dots to emit light; and
the scanning the surface to retrieve information further includes scanning the surface while the surface is illuminated with the second light to retrieve the light emitted from the quantum dots.

7. The method according to claim 1, wherein:
the coating is a paint comprised of a base of white and one or more color pigments; and
the method further comprises forming the coating by mixing the one or more of the pigments in the base, and
the processing the retrieved information includes determining the colors of the one or more pigments from the retrieved information.

8. The method according to claim 7 wherein:
the forming the coating includes providing each of the pigments with a specified amount and type of quantum dots representing the color of the pigment; and
the processing the retrieved information includes determining the colors of the one or more pigments from the determined number of the quantum dots.

9. The method according to claim 1, wherein:
information is embedded in the quantum dots in the form of a multi-color code having multiple color values; and
the processing the retrieved information includes determining the multiple color values of the multi-color code embedded in the quantum dots.

10. The method according to claim 9, wherein:
the coating is a paint having a specified color; and
the processing the retrieved information further includes using the determined multiple color values to identify the specified color of the paint.

11. A system for extracting information from a surface coated with a coating containing quantum dots, the system comprising:

a light source for charging the quantum dots in the surface coating;
a scanner for scanning the surface to retrieve information from the charged quantum dots and to determine a color of the surface; and
a processing unit for processing the retrieved information from the charged quantum dots, including adjusting the retrieved information based on the determined color of the surface, to identify data encoded in the quantum dots.

12. The system according to claim 11, wherein the processing unit filters the retrieved information to adjust the retrieved information based on defined effects of the coating.

13. The system according to claim 11, wherein:
in response to the charging, the quantum dots emit light at a plurality of wavelengths;
the scanner receives the light emitted by the quantum dots at the plurality of wavelengths; and
the processing unit processes the retrieved light emitted by the quantum dots to determine a relative amount of the quantum dots that emit the light at each of the plurality of wavelengths.

14. The system according to claim 11, wherein:
the light source includes a first light source for illuminating the surface, and a second light source for charging the quantum dots to emit light;
the scanner scans the surface while the surface is illuminated with the first light to determine the color of the surface, and scans the surface while the surface is illuminated with the second light to retrieve the light emitted from the quantum dots; and
the processing unit adjusts the retrieved information from the quantum dots, based on the color of the surface, to determine one or more colors of the light emitted from the quantum dots.

15. The system according to claim 11, wherein:
the light source illuminates a predetermined area of the surface;
the scanner scans the surface while the surface is illuminated to retrieve information about a color of the surface; and
the processing unit adjusts the retrieved information from the quantum dots, based on the color of the surface, to determine one or more colors of light emitted from the quantum dots.

16. A method of determining information from a surface coated with a coating containing quantum dots, the method comprising:
illuminating a predetermined light spectrum on a coated surface of an area of a predetermined size, wherein quantum dots in the coated surface are excited to luminesce and emit light;
determining a color of the surface;
analyzing a reflected light from the coated surface by applying a set of predetermined filters, including the determined color of the surface, to identify as colors only the quantum dots that emit a specific color;
determining a number of the quantum dots in said area of the coated surface; and
determining encoded information from said determined number of the quantum dots in said area of the coated surface.

17. The method according to claim 16, wherein the applying a set of predetermined filters includes applying the set of filters to counter effects of the coated surface on the light emitted by the quantum dots.

18. The method according to claim 16, wherein the determining encoded information includes:
- comparing the determined number of the quantum dots to a set of predefined data cubes, wherein an index of the data cubes is determined by a color label tagged on each of the data cubes.

19. The method according to claim 18, wherein data stored within the data cubes are accessed by a color of the quantum dots, then by a hue of the quantum dots, and then by a count of the quantum dots.

20. The method according to claim 16, wherein:
- the illuminating includes illuminating the coated surface with a first light;
- the determining a color of the surface includes scanning the surface while the surface is illuminated with the first light to determine the color of the surface, and
- the applying a set of predetermined filters includes using said determined color of the surface to counter effects of the coated surface on light emitted by the quantum dots.

\* \* \* \* \*